(12) United States Patent
Vetillard et al.

(10) Patent No.: US 7,191,982 B2
(45) Date of Patent: Mar. 20, 2007

(54) FLOOR FOR AIRCRAFT

(75) Inventors: Alban Vetillard, Fonsegrives (FR);
Emmanuel Parro, Toulouse (FR);
Frederic Leclerc, Pechbusque (FR)

(73) Assignee: Airbus France, Toulouse (FR)

( * ) Notice: Subject to any disclaimer, the term of this patent is extended or adjusted under 35 U.S.C. 154(b) by 36 days.

(21) Appl. No.: 11/142,320

(22) Filed: Jun. 2, 2005

(65) Prior Publication Data
US 2006/0226288 A1  Oct. 12, 2006

(30) Foreign Application Priority Data
Jul. 8, 2004  (FR) .................................. 04 07628

(51) Int. Cl.
*B64C 1/18* (2006.01)
(52) U.S. Cl. .................................... 244/119
(58) Field of Classification Search ................ 244/119, 244/120, 131; 52/69, 70, 71
See application file for complete search history.

(56) References Cited

U.S. PATENT DOCUMENTS

| | | | | |
|---|---|---|---|---|
| 3,155,348 A | * | 11/1964 | Ricard | 244/119 |
| 3,405,893 A | * | 10/1968 | Rajau et al. | 244/119 |
| 4,674,712 A | | 6/1987 | Whitener et al. | |
| 5,086,996 A | * | 2/1992 | Roeder et al. | 244/119 |
| 5,222,694 A | * | 6/1993 | Smoot | 244/119 |
| 5,586,391 A | * | 12/1996 | Micale | 29/897.2 |

FOREIGN PATENT DOCUMENTS

GB            531357           1/1941

* cited by examiner

*Primary Examiner*—Tien Dinh
(74) *Attorney, Agent, or Firm*—Oblon, Spivak, McClelland, Maier & Neustadt, P.C.

(57) ABSTRACT

The invention relates to an aircraft floor (4), preferably a cockpit floor, this floor comprising a plurality of spars (14) running along a longitudinal direction (X) of the aircraft and a plurality of cross-beams (16) assembled to the spars and running along a transverse direction (Y) of the aircraft, the floor also comprising attachment means (64) used to assemble it to fuselage frames. According to the invention, the attachment means comprise a plurality of articulations (66) each connected to one end of one of the cross-beams (16), and enabling rotation about the (X) direction.

7 Claims, 6 Drawing Sheets

FLOOR FOR AIRCRAFT

TECHNICAL FIELD

This invention relates in general to an aircraft floor, and more particularly to an aircraft cockpit floor comprising particularly a plurality of spars assembled to a plurality of cross-beams.

Nevertheless, this invention is equally applicable to any aircraft floor such as the cabin floor.

STATE OF PRIOR ART

The shape of an aircraft cockpit floor is adapted to the narrowing of the fuselage that occurs in this part of the aircraft, in a known manner, in the sense that its width reduces towards the forward part of the aircraft.

Furthermore, this type of floor can extend towards the aft part as far as a cabin part of the aircraft, and more generally forms the floor of the entire nose part of the aircraft.

This type of floor is then designed to satisfy several specific needs, for example such as the need for openings for integration of rudder bars and the cockpit central console, so that aircraft occupants can move about, various equipment such as electrical elements or seats can be installed, to resist mechanical forces that occur in the case of an aircraft crash, or to electromagnetically isolate the lower portion and the upper part of the aircraft.

Cockpit floors including spars and metallic cross-beams are known in prior art, for example made from aluminium or one of its alloys, so as to achieve good mechanical stiffness. Moreover, the global stiffness of such a floor is reinforced by the presence of boxes obtained by the addition of upper and/or lower metallic plates on a part of the assembly composed of spars and cross-beams.

Note that the boxes located at the side ends of the floor are also used as means of attachment of this floor onto the cockpit fuselage frames and skins. Furthermore, the parts of the assembly not in box form are covered by a honeycomb sandwich type top skin so that in particular aircraft occupants can walk on the floor.

In this type of embodiment according to prior art, major disadvantages were detected due to the use of boxes for fixing the floor to the aircraft fuselage.

Firstly, it should be noted that the mechanical connections made between these cross-beams and the fuselage frames are of the built-in type, which has the consequence of introducing an important moment about the aircraft longitudinal direction in the cross-beams of the floor, mainly during aircraft pressurisation phases. The fact that this moment is present makes an extremely rigid mechanical connection necessary, and this is usually done using a plurality of rivets or screws, which is disadvantageous in terms of time and assembly costs. Furthermore, this very local concentration of forces makes it necessary to locally oversize floor cross-beams. It may also be necessary to adjust cross-beams to compensate for clearances due to production dispersions.

It is also long and tedious to assemble cross-beams onto the fuselage frames, since a large number of fasteners are necessary.

Finally, if no adjustment is made, undesirable prestressing can be introduced during the assembly of cross-beams on the fuselage frames, that can introduce fatigue problems.

Naturally, these disadvantages will occur in exactly the same way or similarly on all other floors in the aircraft, such as the cabin floor.

OBJECT OF THE INVENTION

Therefore, the purpose of the invention is an aircraft floor that at least partially overcomes the disadvantages mentioned above relative to embodiments according to prior art.

To achieve this, the object of the invention is an aircraft floor, preferably a cockpit floor, this floor comprising a plurality of spars running along a longitudinal direction of the aircraft and a plurality of cross-beams assembled to the spars and running along a transverse direction of the aircraft, the floor also comprising attachment means used to assemble it to the aircraft fuselage. According to the invention, the attachment means comprise a plurality of articulations each connected to one end of one of the cross-beams, and enabling rotation about the longitudinal direction of the aircraft. Furthermore, each articulation comprises a pivot intended to be fixed to a fuselage frame, the pivot being housed in a recess formed in a connection element also forming part of this articulation, this connecting element being fixed to one end of the cross-beams.

Advantageously, the presence of such an articulation between a cross-beam and an associated fuselage frame has the advantage that it provides a degree of freedom between these two elements, which has the consequence of entirely eliminating the moment about the longitudinal direction that occurs in embodiments according to prior art.

Consequently, the size of the cross-beams can be reduced, and the articulation can be mounted on its fuselage frame fairly quickly. Since the stress generated by resistance of forces due to the moment along the longitudinal direction of the aircraft no longer exists, the number of fasteners necessary to assemble the articulation on the frame is very much smaller than the number required to assemble boxes according to prior art by building them in.

Finally, the assembly of articulations on fuselage frames has the advantage that it strongly reduces prestresses induced in the assembly during installation, and therefore results in better resistance to fatigue.

Preferably, the pivot is provided with a plurality of through holes oriented along the longitudinal direction of the aircraft, enabling assembly of this pivot on its associated fuselage frame, preferably using rivets.

Preferably, the pivot is provided with a stop collar opposing displacement of the connection element along the longitudinal direction of the aircraft.

Also preferably, the floor is designed such that there is an articulation at each of the two ends of each of the cross-beams in this floor.

It would be possible for the spars and the cross-beams that jointly form the primary floor structure to be made from a composite material. This advantageously results in a significant reduction in the global mass of this floor. For example, the mass reduction compared with conventional solutions according to prior art using metallic materials could be more than 20%.

Furthermore, the cross-beams and spars made from a composite material are advantageously no longer affected by previously encountered risks of corrosion.

Finally, it should be noted that the type of material used in the floor according to the invention is compatible with all specific needs mentioned above, particularly in terms of resisting mechanical forces that occur in the case of an aircraft crash.

Preferably, the spars and cross-beams are made from a composite material based on resin impregnated carbon fibres. This resin used is preferably a thermoplastic resin such as PEEK, PEKK, PPS resin, etc.

Although PEEK resin is preferred due to the high mechanical performances that can be achieved using it, other thermoplastic resin types could be used, such as the so-called PPS resin mentioned above and obtained by polymerisation of phenylene sulphide. Thermosetting resins could also be used.

Other advantages and characteristics of the invention will become clear after reading the non-limitative detailed description given below.

BRIEF DESCRIPTION OF THE DRAWINGS

This description will be made with reference to the appended drawings among which.

DETAILED DESCRIPTION OF A PREFERRED EMBODIMENT

Figure 1:
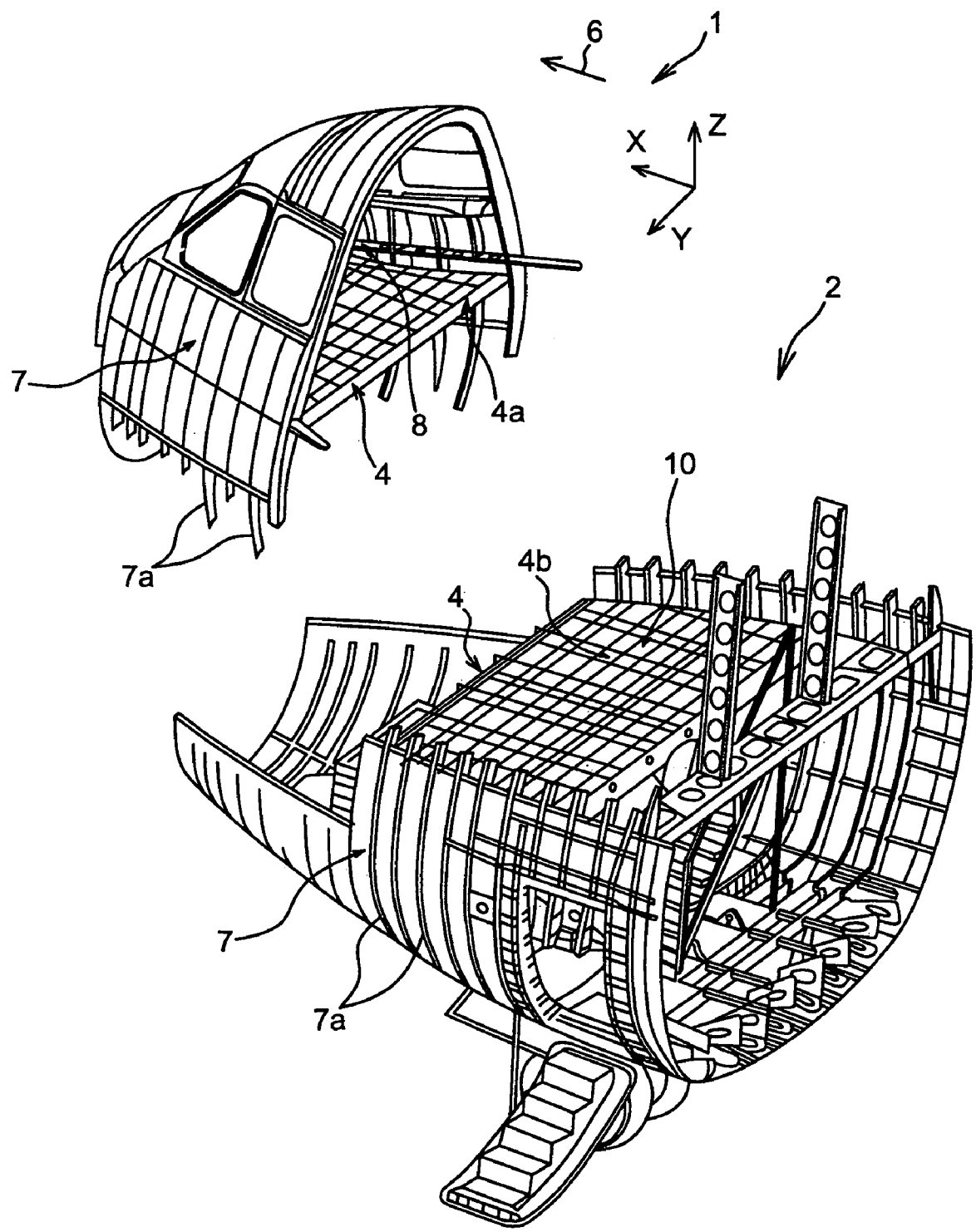
FIG. 1 shows a partially exploded perspective view of the nose part of an aircraft, the aircraft nose comprising a cockpit floor according to a preferred embodiment of this invention.

FIG. 1 shows a partial view of the forward part of an aircraft 1, and more precisely the nose part 2 of this aircraft, comprising a cockpit floor 4 according to a preferred embodiment of this invention.

Throughout the description given below, by convention X denotes the longitudinal direction of the aircraft 1, Y denotes the aircraft transverse direction, and Z denotes the vertical direction, these three directions being orthogonal to each other.

Furthermore, the terms <<forward>> and <<aft>> should be considered with respect to the direction of movement of the aircraft as a result of the thrust applied by the aircraft engines, this direction being shown diagrammatically by the arrow 6.

As can be seen in FIG. 1, the cockpit floor 4 extends in an XY plane over almost the entire length of the nose part 2 of the aircraft, and is installed on a fuselage 7 of the aircraft. As will be explained in detail later, the cockpit floor 4 is installed on fuselage frames 7a of the fuselage 7, these frames 7a being at a spacing from each other along the X direction of the aircraft, and distributed on each side of the floor 4 in the Y direction.

Furthermore, the shape of the floor 4 narrows in the Y direction towards the forward part, due to the narrowing of the fuselage 7 towards the forward direction.

Furthermore, the nose part 2 may comprise a forward cockpit area 8 and an aft cabin area 10, these two areas 8 and 10 normally being separated by a bulkhead (not shown).

More generally, the nose part of an aircraft and the cockpit floor extend over about 10% of the total length of this aircraft along the X direction, namely over a few meters, for example from three to five metres. As an illustrative example, when the aircraft is designed essentially to carry freight and/or military equipment, the aft end of its nose part is delimited by an area that will be used for storage of the elements mentioned above.

As shown, the cockpit floor 4 may possibly be designed as two distinct parts designed to be mechanically assembled, the separation between a forward part 4a and an aft part 4b of the floor being located for example at the bulkhead separating the forward cockpit area 8 from the aft cabin area 10. Nevertheless, to facilitate understanding of the invention, it will be considered in the remaining part of the description that the cockpit floor 4 forms a single element extending practically from one end of the nose part 2 of the aircraft to the other.

Figure 2:
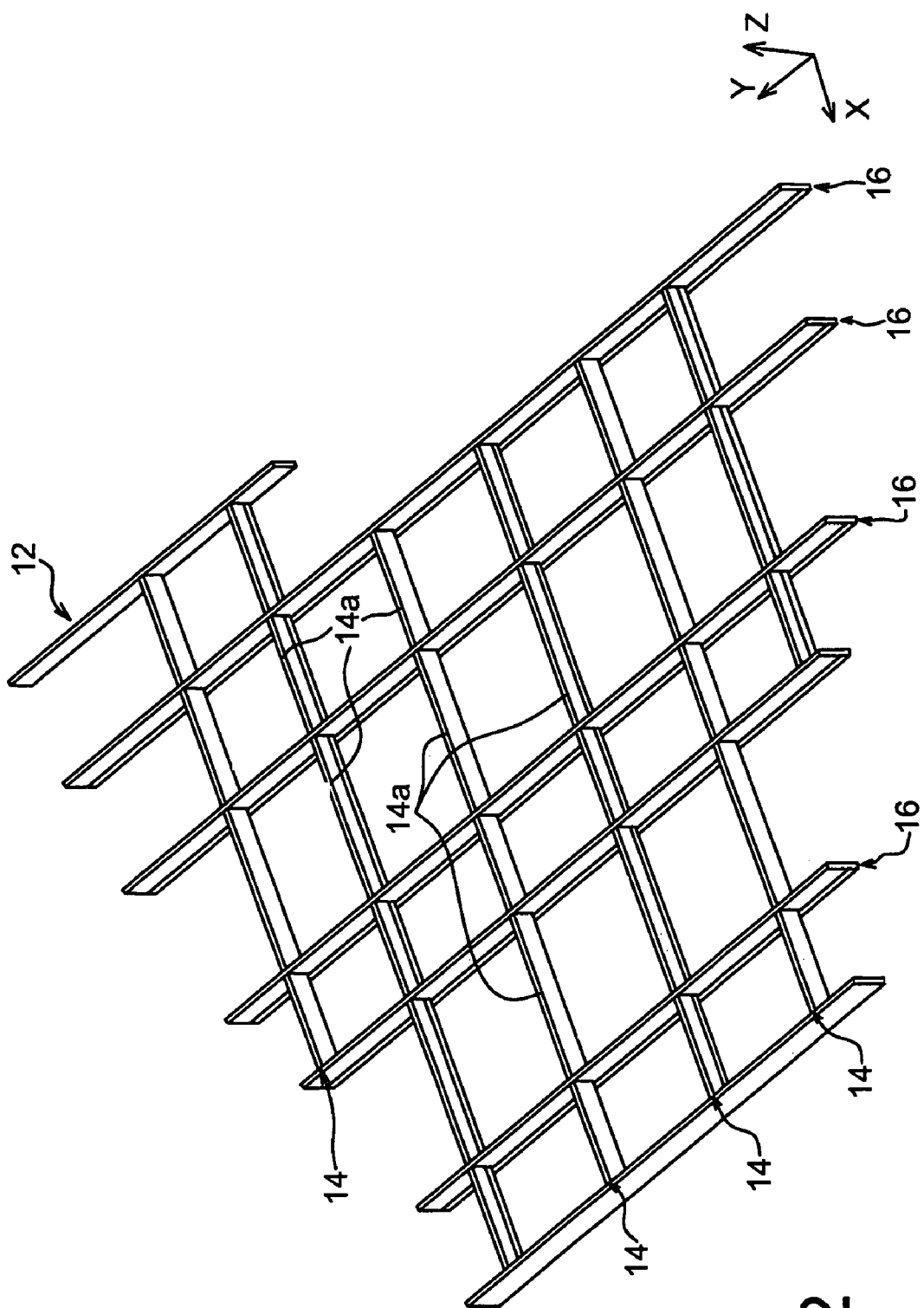
FIG. 2 shows a perspective view of the primary structure of the cockpit floor shown in FIG. 1.

FIG. 2 shows a primary or main structure 12 of the floor 4 shown in FIG. 1, this primary structure 12 being formed from an assembly between a plurality of spars 14 running along the X direction, and a plurality of cross-beams 16 running along the Y direction of the aircraft. It should be noted that this primary structure 12 contributes a significant part of the global stiffness of the cockpit floor 4.

Each spar 14, for example there are six of them, is made from a composite material, and preferably a thermoplastic material made using carbon fibre plies impregnated with PEEK, PEKK or PPS resin.

Each spar 14 then preferably has a C-shaped transverse section like a U-section rotated through 90°, that is particularly easy to make using a stamping press, that can also easily be used to make a C section in which the top and bottom flanges and the web of the C are approximately the same thickness, for example between 2 and 5 mm.

Similarly, the cross-beams 16, for example there are seven of them, are also each made from a composite material, preferably a thermoplastic composite material made using carbon fibre plies impregnated with PEEK, PEKK or PPS resin.

Each cross-beam 16 then preferably has a C-shaped cross-section C similar to a U-section rotated through 90°, in which the top and bottom flanges and the web of the C are approximately the same thickness, for example between 2 and 5 mm.

Preferably, each cross-beam 16 is made from a single piece and extends in the Y direction over the entire width of the primary structure 12. On the other hand, each spar 14 is actually composed of several spar sections 14a and extends in the X direction over the entire length of the primary structure 12.

More precisely, each section 14a of a given spar 14 is positioned between two directly consecutive cross-beams 16 along the X direction, and has two ends rigidly connected to these two corresponding directly consecutive cross-beams 16.

In this respect, note that the advantage of such a configuration lies in the fact that the top flanges of the spar sections 14a and of the cross-beams 16 are located in the same XY plane, consequently these top flanges of the C jointly form a plane top surface of the primary structure 12.

Figure 3:
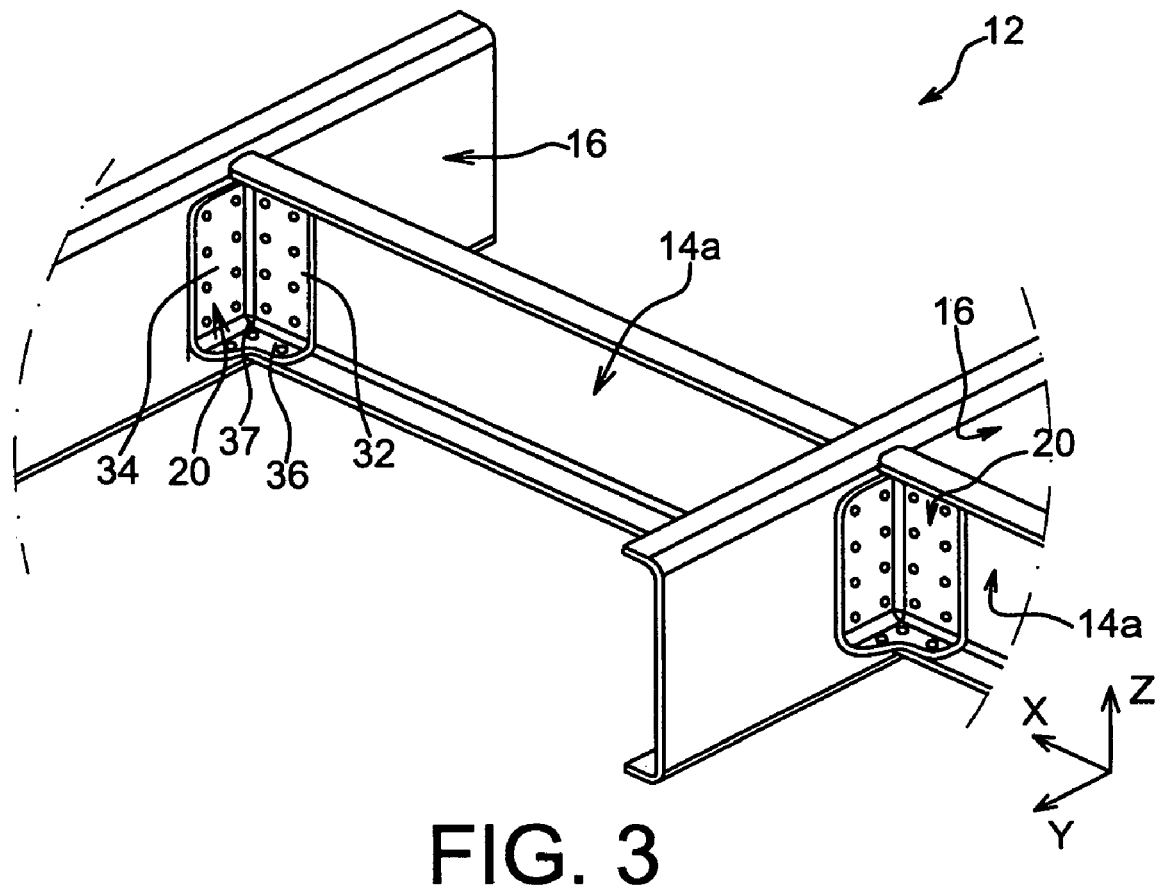
FIG. 3 shows a partial enlarged perspective view of FIG. 2, more particularly showing the assembly between the spar sections and the cross-beams.

FIG. 3 shows that the spar sections 14a are assembled to the cross-beams 16 through junction elements 20 each of which is also made from a composite material, preferably from a thermoplastic composite material made using carbon fibre plies impregnated with PEEK, PEKK or PPS resin.

Globally, each junction element 20 is composed of three plane faces that together form the corner of a cube. In other words, an element 20 comprises a first plane face 32 oriented in an XZ plane, a second plane face 34 oriented in an XZ plane, and a third plane face 36 oriented in an XY plane, each of these three faces having two junction edges (not shown) forming the junction with the other two faces. Furthermore, preferably the three faces 32, 34 and 36 all have the same thickness and all join together in an approximately rounded area 37.

Figure 4:
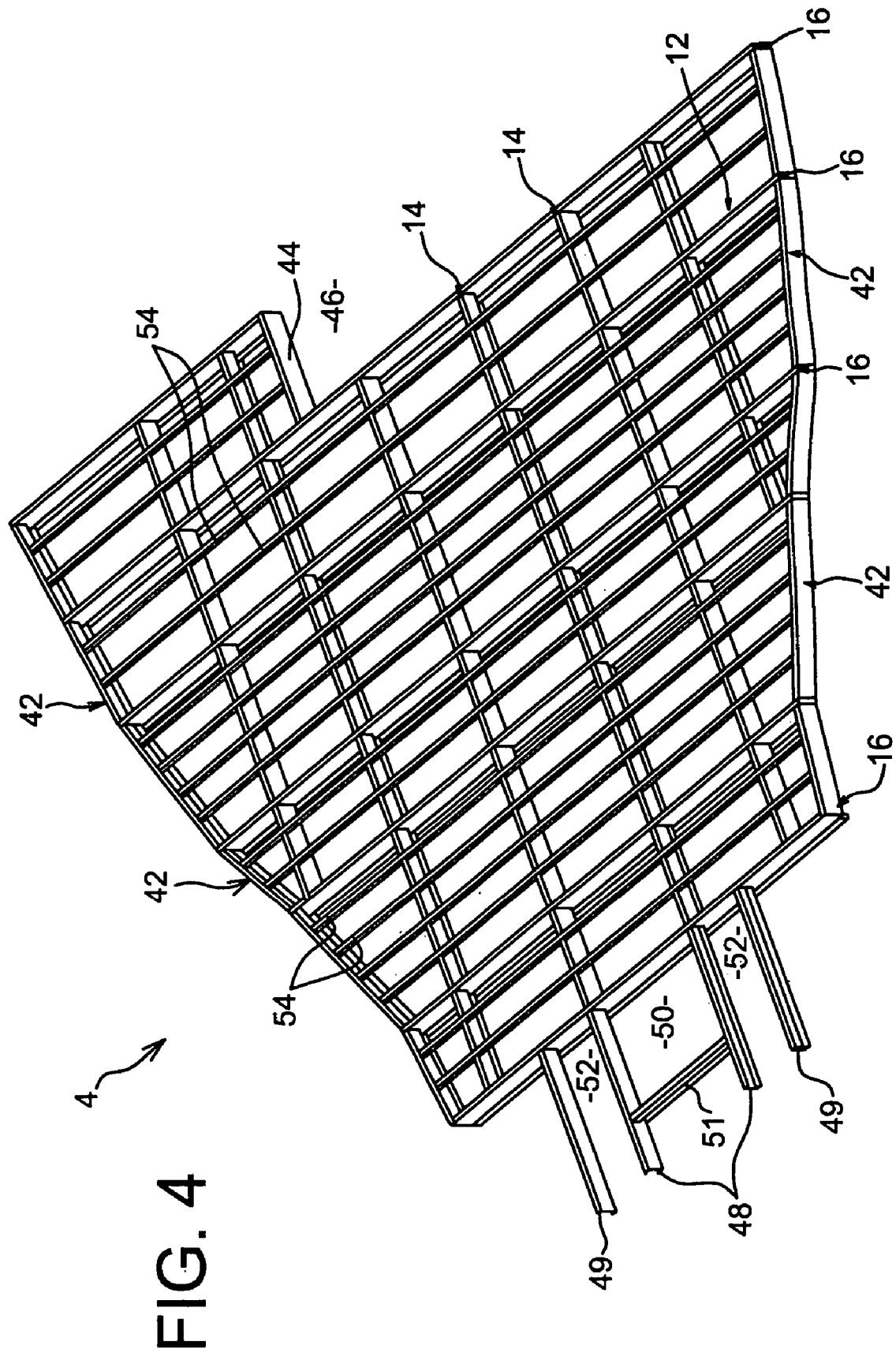
FIG. 4 shows a partial perspective view of the cockpit floor shown in FIG. 1, said floor being shown without its skin.

FIG. 4 shows part of the cockpit floor 4, this floor 4 comprising the primary structure 12 on which peripheral spars 42 were assembled, these spars being identical to or similar to spar sections 14*a* in the primary structure. As can be seen clearly in FIG. 4, the peripheral spars 42 can be used to connect the ends of cross-beams 16 in the primary structure 12 to each other in pairs.

As an illustrative example, it should be noted that the floor 4 is also provided with a small spar 44 located behind the primary structure 12, and cooperates with an aft cross-beam 16 to define an offset 46 in the structure 12, this offset 46 being adapted to contain a staircase (not shown) for which a top step would be close to the small spar 44.

Furthermore, forward secondary spars 48, 49 (preferably four spars) made from a thermoplastic composite material made using PEEK, PEKK or PPS resin and carbon fibre plies, are fixed to the furthest forward cross-beam 16 of the primary structure 12.

The two secondary spars 48 located closest to the centre jointly delimit a space 50 in which a central cockpit console (not shown) will fit, and can each be located in line with and prolonging a spar 14 of the structure 12. They can also be connected to each other at the forward end through a small cross-beam 51 that can also support the central console.

Each of the two secondary side spars 49 also cooperates with one of the two secondary spars 48 to delimit a space 52 into which the rudder bars (not shown) will fit, such that the two spaces 52 obtained are located on each side of the space 50 in the transverse direction Y of the aircraft.

The cockpit floor 4 also comprises stiffener elements 54 that preferably extend along the Y direction, between the cross-beams 16 of the primary structure 12. For example, the stiffener elements 54 are made from a composite material, preferably a thermoplastic composite material made using PEEK, PEKK or PPS resin and carbon fibre plies, and for example there may be between two and five of them, between two cross-beams 16 directly consecutive to each other in the X direction.

Figure 5:
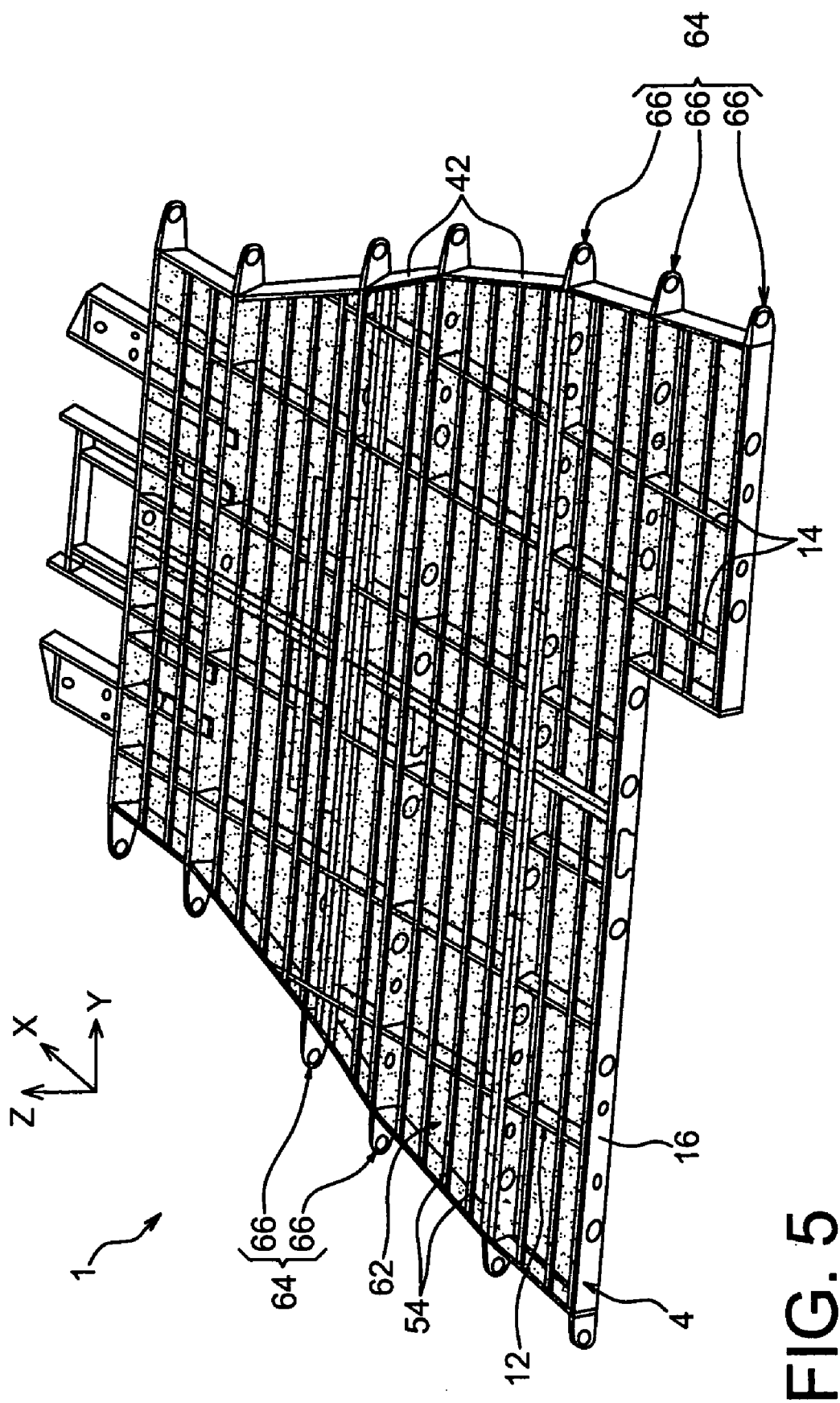
FIG. 5 shows a perspective view of the cockpit floor shown in FIG. 1, corresponding to the floor shown in FIG. 4 to which a top skin has been assembled with attachment means for assembling it onto the cockpit fuselage frames.

The top parts of the stiffener elements 54 jointly define a top surface that is coincident with the top surface of the primary structure 12, on which a skin will be placed like that shown in FIG. 5.

This skin 62 is rigidly assembled on the spars 14, the cross-beams 16 and on the stiffener elements 54. Note in this respect that these elements 54 are preferably assembled on a lower surface of the skin 62, for example by riveting, before the lower surface of this skin 62 is assembled on the top flanges of the spars 14 and the cross-beams 16.

Once again, the skin 62 is preferably made from a composite material with an approximately constant thickness, and preferably a thermoplastic composite material made using PEEK, PEKK or PPS resin and carbon fibre plies.

In FIG. 5, since the primary structure 12 is not covered by a lower skin, it should be considered that the upper skin 62 only forms half-boxes with the spars 14 and the cross-beams 16.

Also with reference to FIG. 5, it can be seen that the floor 4 is provided with attachment means 64 so that it can be assembled to the fuselage frames 7*a* mentioned above.

Globally, the attachment means 64 are composed of a plurality of articulations 66, each of the articulations 66 being installed at one end of one of the cross-beams 16, so that it can be fixed to a nearby fuselage frame 7*a*. More precisely, each cross-beam 16 of the floor 4 supports two articulations 66 arranged at each of its two ends. Nevertheless, it should be noted that in the preferred embodiment shown, the cross-beam 16 furthest in the aft direction forms an exception, since there is only one articulation 66 due to its small size in the Y direction. Only one of the two ends will be located facing and close to a frame 7*a* of the fuselage 7, the other end participating in delimiting the offset 46.

Figure 6:
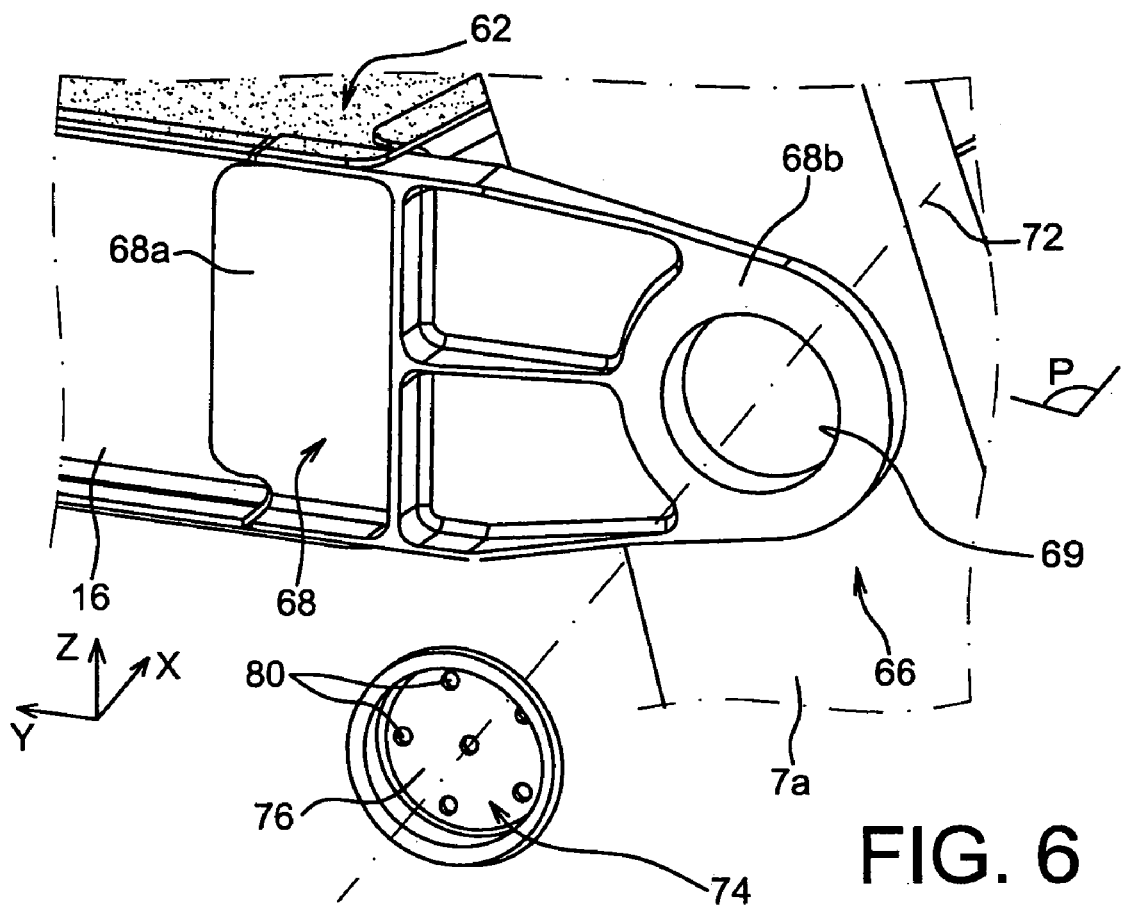
FIG. 6 shows a partially exploded perspective view more specifically showing an articulation forming part of the attachment means shown in FIG. 5.

FIG. 6 shows an arbitrary articulation 66 belonging to the fastening means 64 shown in FIG. 5, when this articulation 66 is installed on its associated fuselage frame 7*a*.

The articulation 66 has a connection element 68 connected fixed to the end of the cross-beam 16, preferably by riveting or welding. This connection element 68 may be metallic and is globally arranged in a YZ plane, and comprises a first end 68*a* fixed to the cross-beam 16, and a second end 68*b* (or clevis) opposite the first end 68*a* along the Y direction.

This second end 68*b* thus projects from the cross-beam 16 in the Y direction, and comprises a circular recess (or orifice) 69 with an axis 72 parallel to the X direction, which is preferable a through orifice.

In one alternative embodiment, the connection element 68 may be integrated into the cross-beam 16 directly while the cross-beam is being manufactured. In this case, it is made from the same material as the cross-beam 16, namely a metallic or a composite material.

The articulation 66 comprises a second element 74 additional to the connection element 68, this second element 74 called the pivot element having the same axis 72 as the circular recess 69. This second element 74 is then shaped so that it engages into and fits into the housing 69, as shown diagrammatically in the exploded view in FIG. 6. This pivot 74 has a central portion 76 oriented along a YZ plane, and being in plane contact with a side wall of the fuselage frame 7*a*.

The central portion 76 is provided with through holes 80 along the X direction, these holes 80 being designed to hold rivets (not shown) fastening the pivot 74 on the frame 7*a*, and more particularly on the side wall of this frame which also lies along a YZ plane. The use of a plurality of rivets thus guarantees that rotation will only be possible between the pivot 74 and the second end 68*b* of the connection element 68.

One possible alternative would be to replace these through holes 80 by pilot holes to facilitate positioning of the rivets that will fix the pivot 74 on the frame 7*a*.

Figure 7:
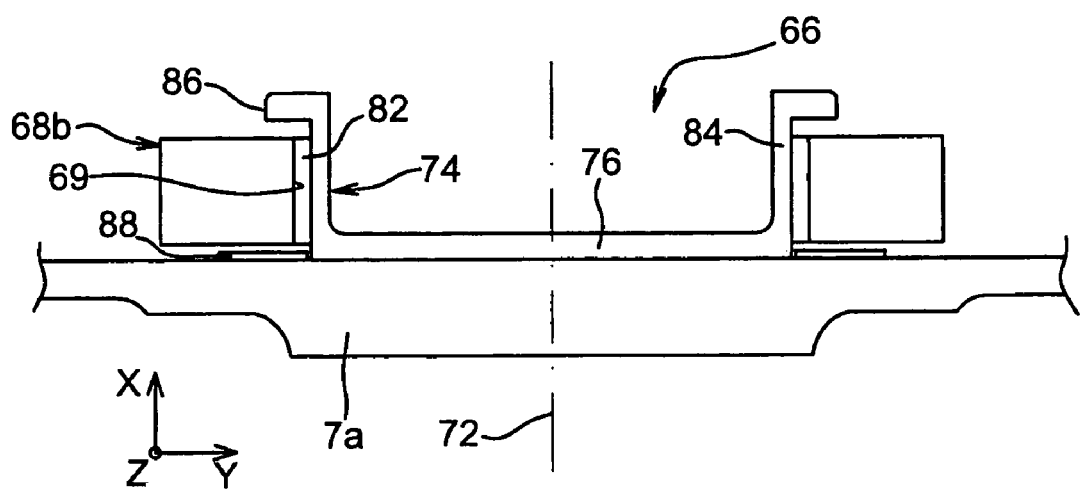
FIG. 7 shows sectional view according to plane P in FIG. 6.

We will now refer to FIG. 7 showing a sectional view along a plane P in FIG. 6, this plane P being an XY plane passing diametrically through the second element 74 and the second end 68*b* of the element 68.

Firstly, it can be seen that the recess 69 in the second end 68*b* and the pivot 74 provide a genuine degree of freedom between the cross-beam 16 and the frame 7*a*, since these two elements 68*b*, 74 are capable of pivoting freely with respect to each other about the axis 72 parallel to the X longitudinal direction.

An intermediate ring 82 can be inserted between the edges of the recess 69 and the second pivot type element 74, and mounted fixed to the connection element 68 for example by cold assembly or by gluing, to facilitate this pivoting and to reduce risks of work hardening. A copper-beryllium or bronze ring 82 will be preferred if the connection element 68 is metallic, for example made of aluminum. However, if the connection element 68 is made of a composite material, the ring 82 will preferably be made of titanium or stainless steel.

With this type of configuration, the parts in contact that can pivot with respect to each other are then the intermediate ring 82 and a part of the bearing 84 of the pivot 74. In this respect, it should be noted that this part of the bearing 84 is preferably in the form of a tube fixed at one of its ends to the central portion 76, as shown in FIG. 7.

This figure shows a stop collar 86 at the same level as the other end of the part of the bearing 84, this collar 86 being located approximately in a YZ plane with the function of forming a stop for the second end 68b along the X direction. The second end 68b meets another stop formed by a wear shim 88 that is preferably installed glued onto the side wall of the fuselage frame 7a, along the same X direction but in the opposite direction, therefore this shim preferably having an annular shape.

Finally, it should be noted that the second end 68b is installed with a certain clearance between the stop collar 86 and the wear shim 88, obviously so as to allow the articulation 66 to rotate freely and to compensate for clearances between the cross-beams 16 and the fuselage frames 7a without introducing any adjustment or prestress. It should be noted also that the articulations 66 of the fastening means 64 are stressed particularly when the cockpit changes from a pressurised state to a normal state and vice versa, since pressurisation of the cockpit usually causes the floor 4 to bend downwards.

These articulations 66 are therefore capable of resisting forces along the Y and Z directions and passing between the rigid structure 12 and the fuselage frames 7a of the cockpit, the forces along the X direction being resisted using auxiliary means not divulged in this application.

Obviously, those skilled in the art could make various modifications to the cockpit floor 4 that has just been described solely as a non-limitative example. In particular, although the detailed description given above refers to a cockpit floor, it will naturally be understood that it is equally applicable to any other aircraft floor such as the cabin floor, without going outside the scope of the invention.

The invention claimed is:

1. An aircraft floor comprising:
   a plurality of spars running along a longitudinal direction of an aircraft;
   a plurality of cross-beams assembled to said spars and running along a transverse direction of the aircraft,
   attachment means for assembling said floor to fuselage frames, said attachment means comprising a plurality of articulations each connected to one end of one of said cross-beams, and enabling rotation about the direction, each articulation comprising a pivot intended to be fixed to a fuselage frame, said pivot being housed in a recess formed in a connection element also forming part of said articulation, said connecting element being fixed to one end of one of said cross-beams;
   wherein the pivot is provided with a plurality of through holes oriented along the longitudinal direction, enabling assembly of said pivot on its associated fuselage frame.

2. A floor according to claim 1, wherein said pivot is provided with a stop collar opposing displacement of the connection element along the direction.

3. A floor according to claim 1, wherein an articulation is provided at each of the two ends of each of said cross-beams.

4. A floor according to claim 1, wherein said spars and said cross-beams are made from a composite material.

5. A floor according to claim 4, wherein said spars and said cross-beams are made from a thermoplastic composite material.

6. A floor according to claim 5, wherein said thermoplastic composite material is made using carbon fibre plies impregnated with PEEK, PEKK or PPS resin.

7. A floor according to claim 1, wherein said floor is an aircraft cockpit floor.

* * * * *